United States Patent
Peppard

[19]

[11] Patent Number: 6,004,067
[45] Date of Patent: Dec. 21, 1999

[54] INTERLOCKING MODULAR FLUID-CONTAINMENT SYSTEM AND METHOD FOR CONSTRUCTING THE MODULE

[75] Inventor: Dennis L. Peppard, Casper, Wyo.

[73] Assignee: Segment Systems, Inc., Casper, Wyo.

[21] Appl. No.: 08/961,282

[22] Filed: Oct. 30, 1997

Related U.S. Application Data

[60] Provisional application No. 60/030,271, Nov. 1, 1996.

[51] Int. Cl.[6] .................................................. E02B 13/00
[52] U.S. Cl. ............................ 405/52; 405/15; 405/107; 405/114; 405/115
[58] Field of Search ................................. 405/52, 15, 16, 405/19, 21, 91, 107, 108, 111, 114, 115, 222, 270; 52/591.3, 592.2, 592.3, 592.6

[56] References Cited

U.S. PATENT DOCUMENTS

| | | | |
|---|---|---|---|
| 1,421,857 | 7/1922 | Store | 405/222 |
| 3,213,628 | 10/1965 | Serota | 405/111 |
| 3,234,741 | 2/1966 | Ionides | 405/270 |
| 3,886,751 | 6/1975 | Porraz Jimenez Labora | 405/15 X |
| 3,957,098 | 5/1976 | Hepworth et al. | 405/19 X |
| 4,362,433 | 12/1982 | Wagner et al. | 405/107 |
| 4,565,043 | 1/1986 | Mazzarese | 52/592.6 |
| 4,869,617 | 9/1989 | Chiodo | 405/114 X |
| 4,981,392 | 1/1991 | Taylor | 405/15 X |
| 5,040,919 | 8/1991 | Hendrix | 405/91 X |
| 5,125,767 | 6/1992 | Dooleage | 405/21 X |
| 5,454,195 | 10/1995 | Hallsten | 405/52 X |
| 5,775,046 | 7/1998 | Fanger et al. | 52/591.3 X |

FOREIGN PATENT DOCUMENTS

| 90412 | 4/1987 | Japan | 405/115 |
|---|---|---|---|

*Primary Examiner*—David Bagnell
*Assistant Examiner*—Jong-Suk Lee
*Attorney, Agent, or Firm*—Dean P. Edmundson

[57] ABSTRACT

A portable, modular fluid-containment system is described which can be assembled anywhere to form a wall or dike for preventing fluids (e.g., water) from escaping from their intended location and for preventing flooding. The system uses individual collapsible modules which can be stacked in rows and columns, as desired. The modules overlap each other and are also interconnected so that a liquid such as water can be used to fill all of the modules to make them more stable and immobile.

19 Claims, 12 Drawing Sheets

6,004,067

INTERLOCKING MODULAR FLUID-CONTAINMENT SYSTEM AND METHOD FOR CONSTRUCTING THE MODULE

CROSS-REFERENCE TO RELATED APPLICATION

This application is based upon, and claims priority from, my copending provisional application Serial No. 60/030,271, filed Nov. 1, 1996.

FIELD OF THE INVENTION

This invention relates to fluid-containment systems. More particularly, this invention relates to methods and portable structures for preventing a fluid such as water or chemicals from flooding an adjacent area.

BACKGROUND OF THE INVENTION

There are many situations where it is necessary or highly desirable to be able to prevent fluids (such as water or chemicals) from flowing into areas where the fluids can cause damage. For example, in areas where there are swollen rivers resulting from heavy rains or spring run-off, it is often necessary to build earthen levees or to stack sandbags along the river banks in order to prevent the high water from damaging residential areas or valuable property. Then after the river level has gone down, the levees or sandbags can be removed.

Also, it is usually necessary or desirable to build berms or to stack sandbags around oil or chemical tanks to contain any chemicals which would be released in the event that the tanks would leak.

Building earthen levees, or filling and stacking sandbags, is very time-consuming and labor-intensive. Also, after the crisis has passed (i.e., after flood waters have receded or spilled chemicals have been removed) it is another time-consuming and labor-intensive task to remove the levees or sandbags.

There has not heretofore been provided a portable, easy-to-use, and effective fluid containment system having the advantages and features provided by the present invention.

SUMMARY OF THE INVENTION

In accordance with the present invention there is provided a portable, modular fluid-containment system comprising a plurality of interlocking modules or segments which can be easily deployed in an area where fluid containment is required. The modules or segments are preferably collapsible plastic units with an internal cavity. It is also preferable for the segments or units to include wings extending outwardly from opposite sides to facilitate locking of one segment to another when several segments are stacked upon each other in brick-like fashion.

The segments include ports (a plurality of apertures communicating with the internal cavity) and couplers (operable closure members) enabling them to be connected so that the segments can be easily filled with fluid (e.g., water). The fluid fills the internal cavity in each segment to provide weight and ballast to the assembled system (which may be in the form of an elongated dike or wall, for example). After the need for the containment system has passed, the fluid can be drained from the assembled system, and the individual segments can be disconnected and loaded onto a truck or trailer for transport or storage.

The system of the invention is light in weight and can be rapidly deployed when needed. The individual segments preferably have walls composed of flexible plastic so that the segments can be collapsed for transport and storage, yet they can be filled with fluid when necessary during use.

The segments can be made in any desired size. Preferably the segments are all of the same design and size such that only one style is required, with the fluid couplers in each segment being adapted to connect to similar couplers in an adjacent segment. Preferably there are six fluid couplers in each segment (one in the top surface, one in the bottom, one in each side wall, and one in each end). Adjacent segments are coupled together in at least one location.

Other advantages and features of the system of this invention will be apparent from the accompanying drawings and the following detailed description.

BRIEF DESCRIPTION OF THE DRAWINGS

The invention is described in more detail hereinafter with reference to the accompanying drawings, wherein like reference characters refer to the same parts throughout the several views in which:

FIG. 1A is an end view of a portion of a wing member of the module shown in FIG. 1;

DETAILED DESCRIPTION OF THE INVENTION

Figure 1:
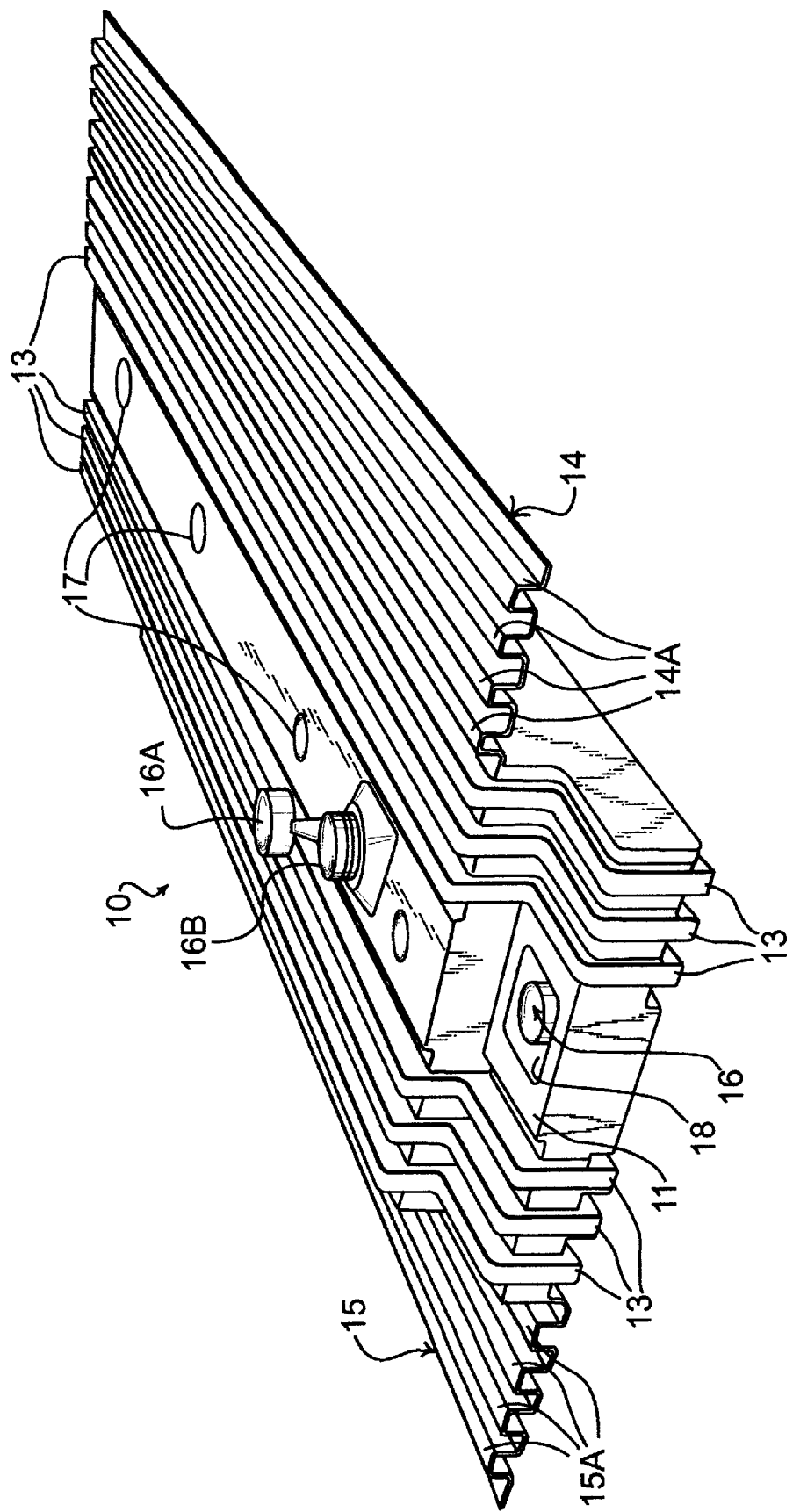
FIG. 1 is an end perspective view of one embodiment of a segment or module which is useful in the system of this invention.
Figure 2:
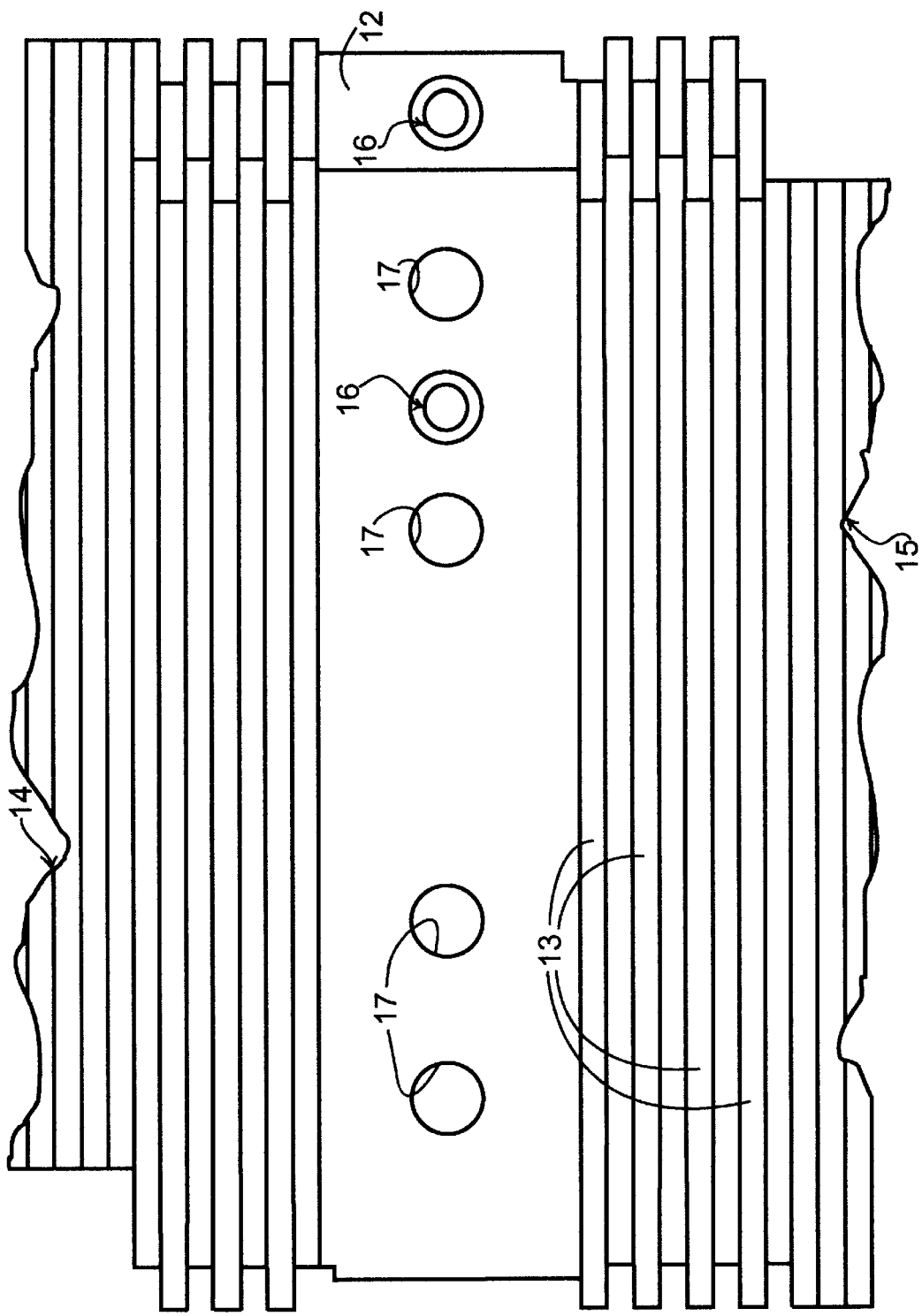
FIG. 2 is a bottom view of the module shown in FIG. 1.

The invention is a portable, modular fluid-containment system which can be assembled anywhere to form a wall or dike for containing fluids or for preventing fluids from escaping from their intended location. For example, the system can be used to increase the height of existing river levees to prevent high river water from escaping and flooding adjacent property. Also, the system could be used to build a temporary wall around a water-treatment plant to keep flood waters from damaging the plant. The system could also be used for protecting property adjacent to large oil or chemical tanks in the event of a leak.

The system of the invention comprises the use of a plurality of modules or segments which can be stacked and connected together in a manner such that a wall of desired length, height and width is constructed to serve as a fluid barrier. One embodiment of a module or segment 10 is shown in FIGS. 1–4. This segment has a length greater than its width and includes a step or ledge 11 at one end and a complementary shaped overhang or ledge 12 at its opposite end. This feature enables one segment end to mate with the abutting end of an adjacent segment when they are laid end-to-end.

Preferably the module or segment includes spaced-apart, longitudinal raised ribs 13 therealong. Preferably each module or segment also includes a laterally-projecting wing 14 on one side and another laterally-projecting wing 15 on the opposite side, as shown. Preferably the wings include spaced-apart, longitudinal raised ribs 14A and 15A, respectively. Preferably each wing is integral with the body of the segment, as shown.

When the wing of one module or segment is laid on top of another segment, the ribs of the wing fit between the body ribs of the other segment. This is one aspect of an interlocking feature which is very advantageous.

Figure 3:
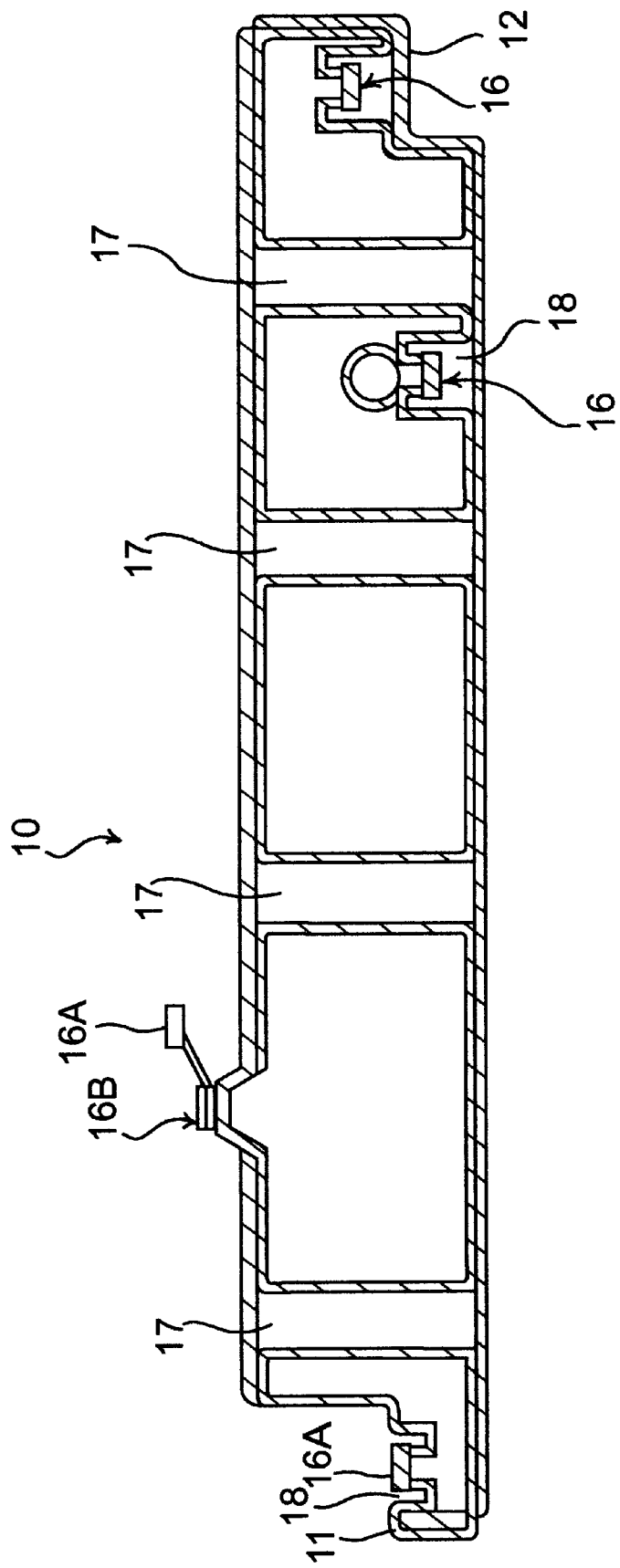
FIG. 3 is a cross-sectional view of the segment shown in FIG. 1.

Each module or segment includes a plurality of couplers 16 (with a threaded cap 16A) which enable each segment to be coupled to another adjacent segment. Preferably the couplers are located at six locations on each segment (top, bottom, each side, and each end). Each coupler is a conventional unisex style so that it can be connected to any similar coupler on an adjacent segment. Each coupler 16 includes a base portion 16B which enables the coupler to be pulled outwardly from the module (as shown at the top of the module in FIGS. 1 and 3) or pushed into a corresponding recessed area 18 in the module (as is also illustrated in FIGS. 1 and 3). The corresponding couplers 16 of abutting modules may be connected together so that the cavities of the abutting modules communicate through the connected couplers.

Each segment is preferably composed of flexible plastic and includes a hollow cavity therein. It is also preferable for each segment to include a member of vertical walled openings 17 extending therethrough, as shown in FIG. 3.

Figure 4:
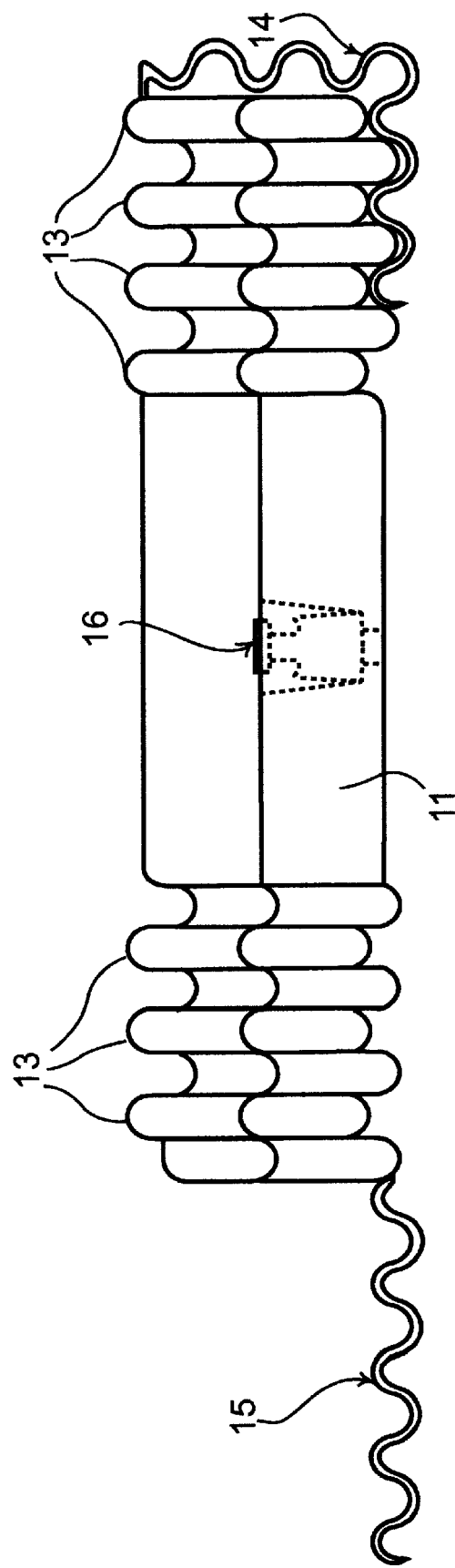
FIG. 4 is a front elevational view of another embodiment of a module or segment useful in this invention showing one wing member folded downwardly and around the bottom of the segment.

Preferably each wing member extends outwardly sufficiently so that it can be folded downwardly along the side of the body and beneath the segment (as shown in FIG. 4). This feature is utilized when one side of the segment is facing the fluid to be contained by the system (and it is desired not to have the wing projecting into the fluid).

The size of the modules or segments may vary. A preferred size for the body is about 48 inches wide, 12 inches high, and 90 to 96 inches long. The wings preferably project outwardly about 20 to 24 inches.

The sides of the ribs of each wing and those along the length of the body preferably taper about 50 towards each other so that when a ribbed module or segment is positioned thereon, a tight fit is obtained between the segment and the wing (or between stacked segments).

Figure 5:
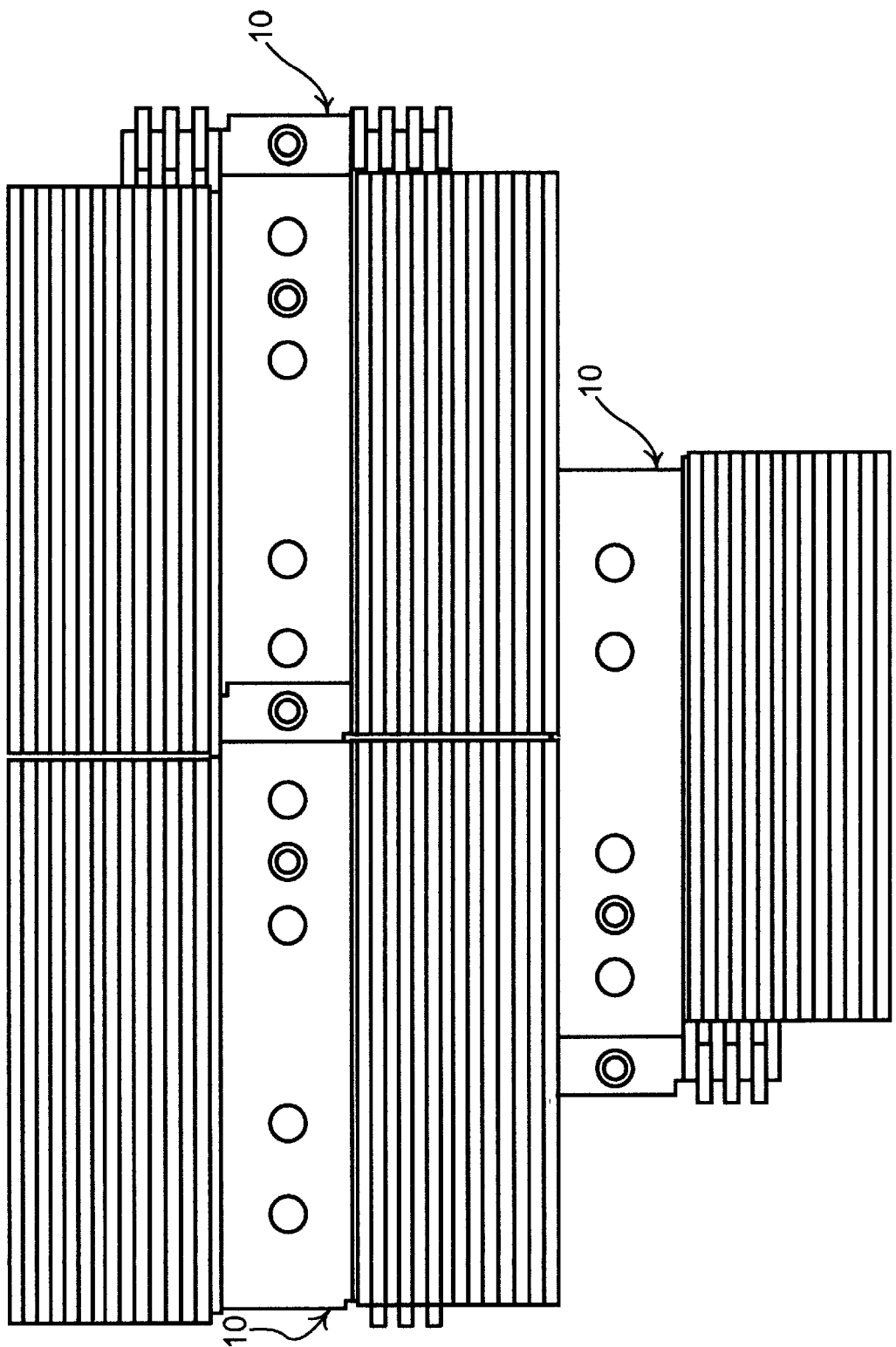
FIG. 5 is a top plan view showing several modules or segments connected together.

FIG. 5 illustrates several modules or segments 10 which have been assembled (e.g., to form a wall for containing fluid).

Figure 6:
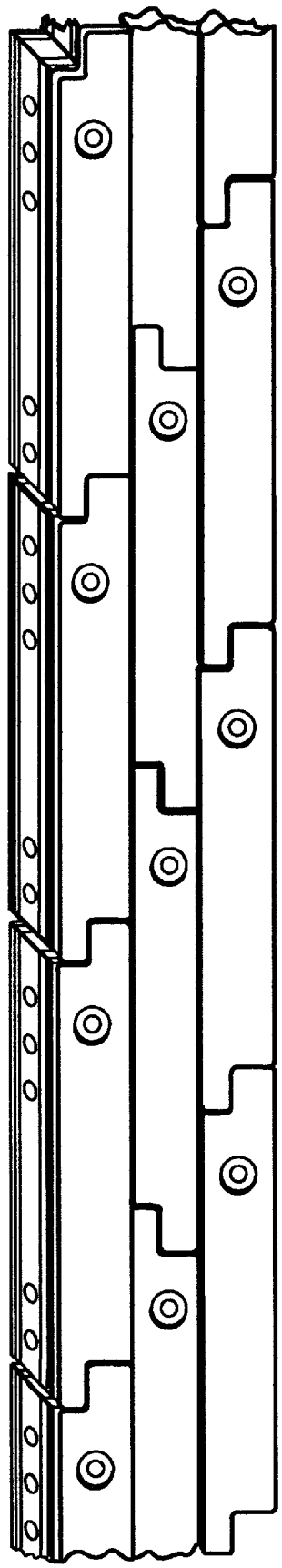
FIG. 6 is a side perspective view showing several modules or segments laid on top of each other to form a wall.

FIG. 6 is a perspective view of several modules or segments laid in a brick-like manner to form a wall structure.

The wings are not shown in this figure. Each segment is coupled to each abutting segment via couplers 16 so that water can be injected into each segment for ballast purposes. Also, water injected into the lower course of stacked segments will automatically flow through the lower segments into the upper segments via the fluid couplers 16.

Figure 7:
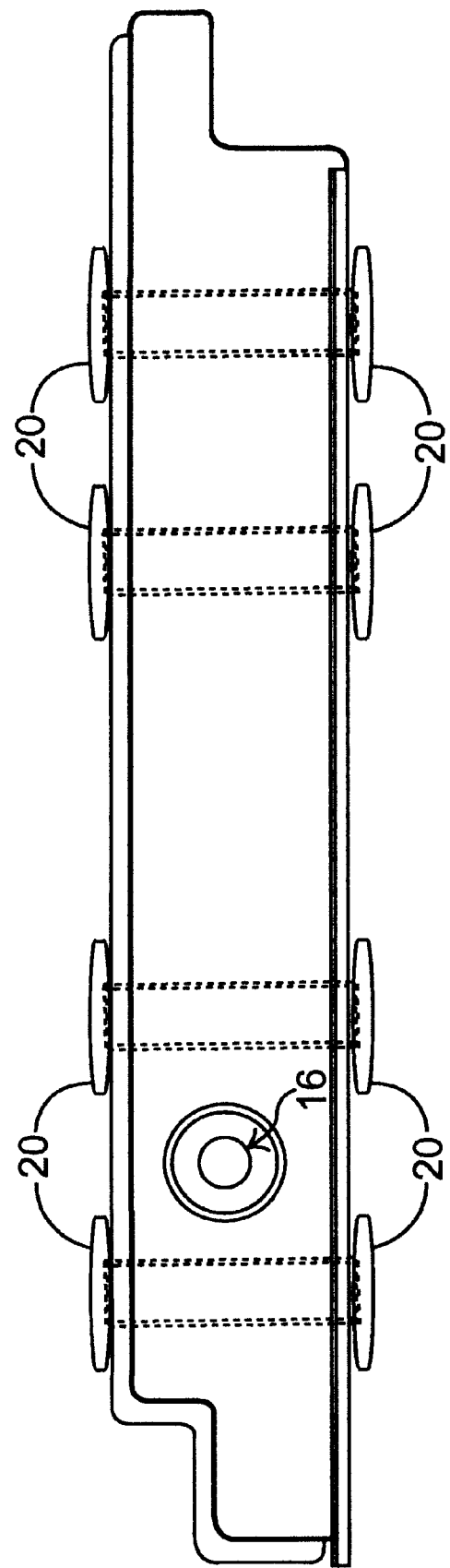
FIG. 7 is a side elevational view of a module or segment with connecting disks secured at the top and bottom ends of support columns positioned through openings in a module or segment structure.
Figure 8:
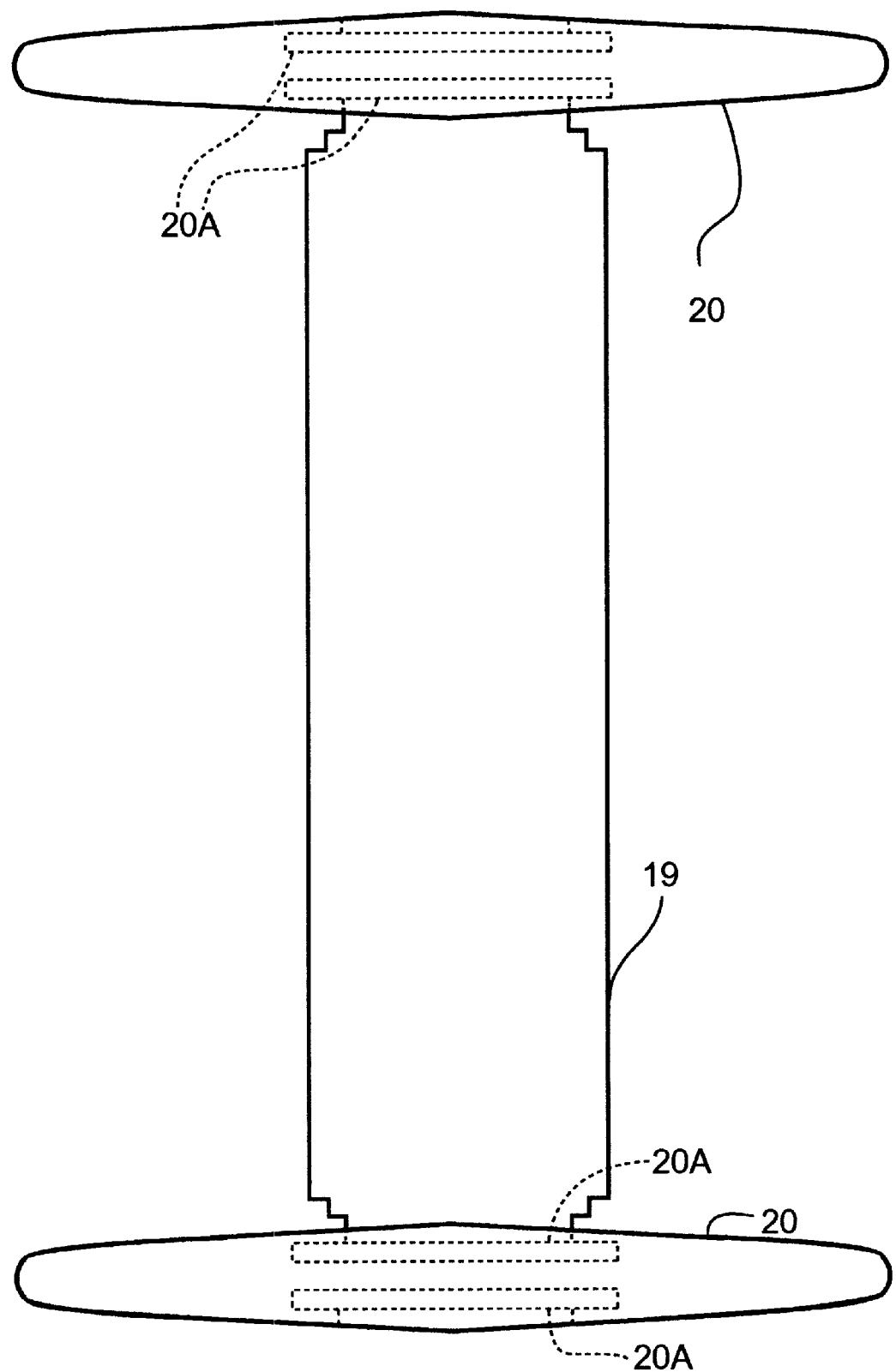
FIG. 8 is a side elevational view showing a support column with disks connected to its top and bottom ends.
Figure 9:
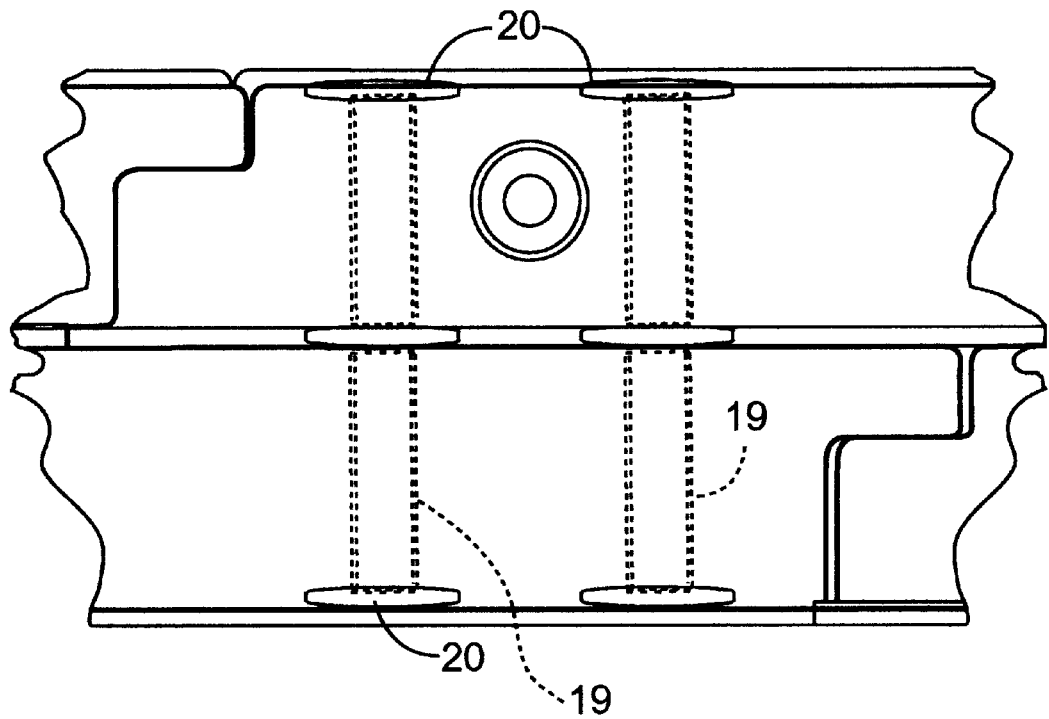
FIG. 9 is a side elevational view showing two vertical rows of modules or segments connected together by means of support columns extending through the segments.

For additional structural reinforcement of the segments, a column or rod member 19 can be positioned in the openings 17 extending through each segment, and a disk 20 can be attached to each end of the column or rod. Then another similar column or rod 19 in an overlying segment can be connected thereto. See FIGS. 7–9.

Figure 10:
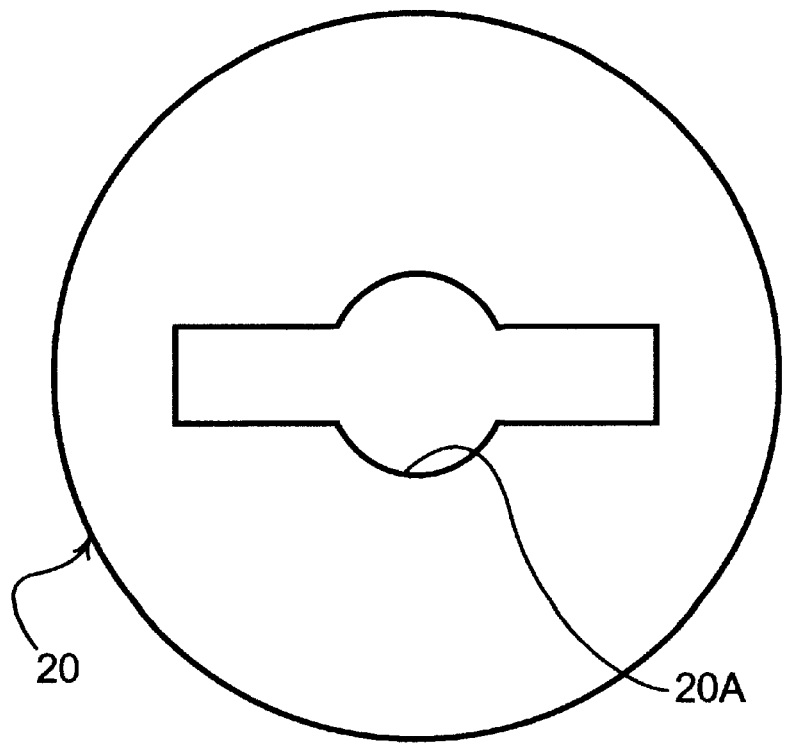
FIG. 10 is a top view of a disk showing the slotted opening therein for enabling connection thereto of one end of a support column.

FIG. 10 is a top view of a disk 20 showing a key opening 20A therein. A complementary shaped key in the end of column 19 can be secured therein to make a physical connection. The bottom side of the disk also includes a similar opening 20A for connection to another column or rod.

Figure 11:
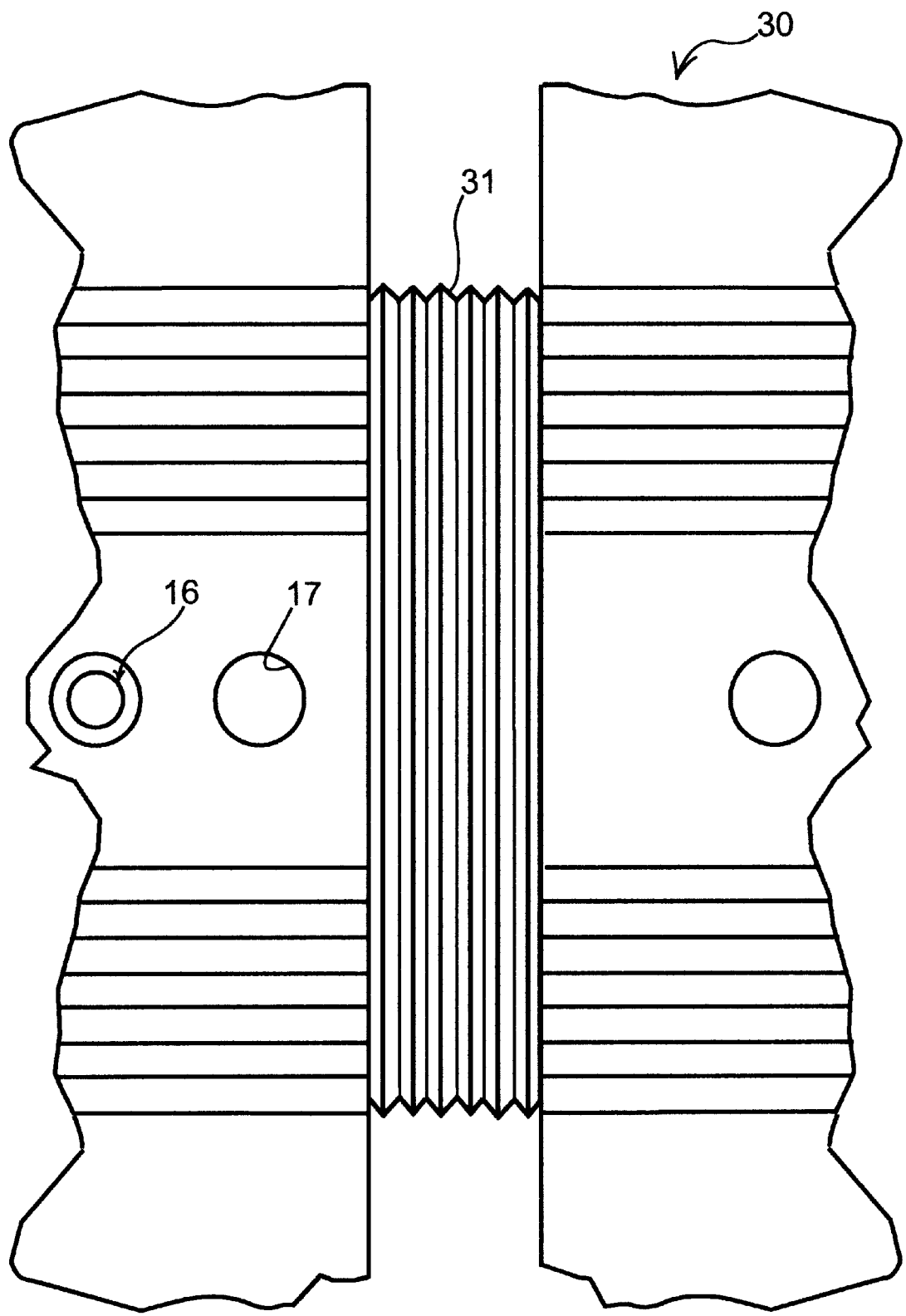
FIG. 11 is a top view of another embodiment of module or segment which includes an articulating joint or section.
Figure 12:
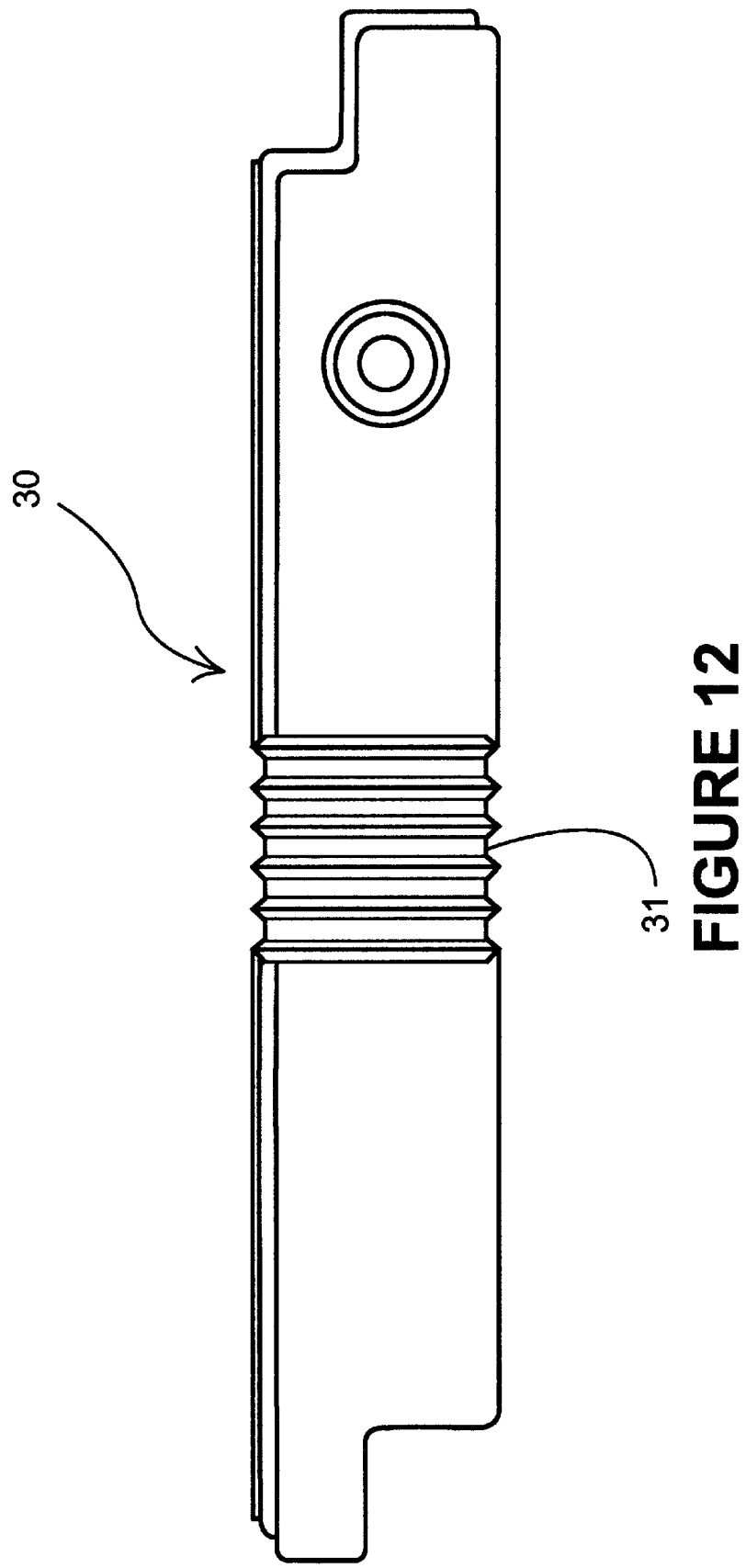
FIG. 12 is a side elevational view of the module or segment shown in FIG. 11.
Figure 13:
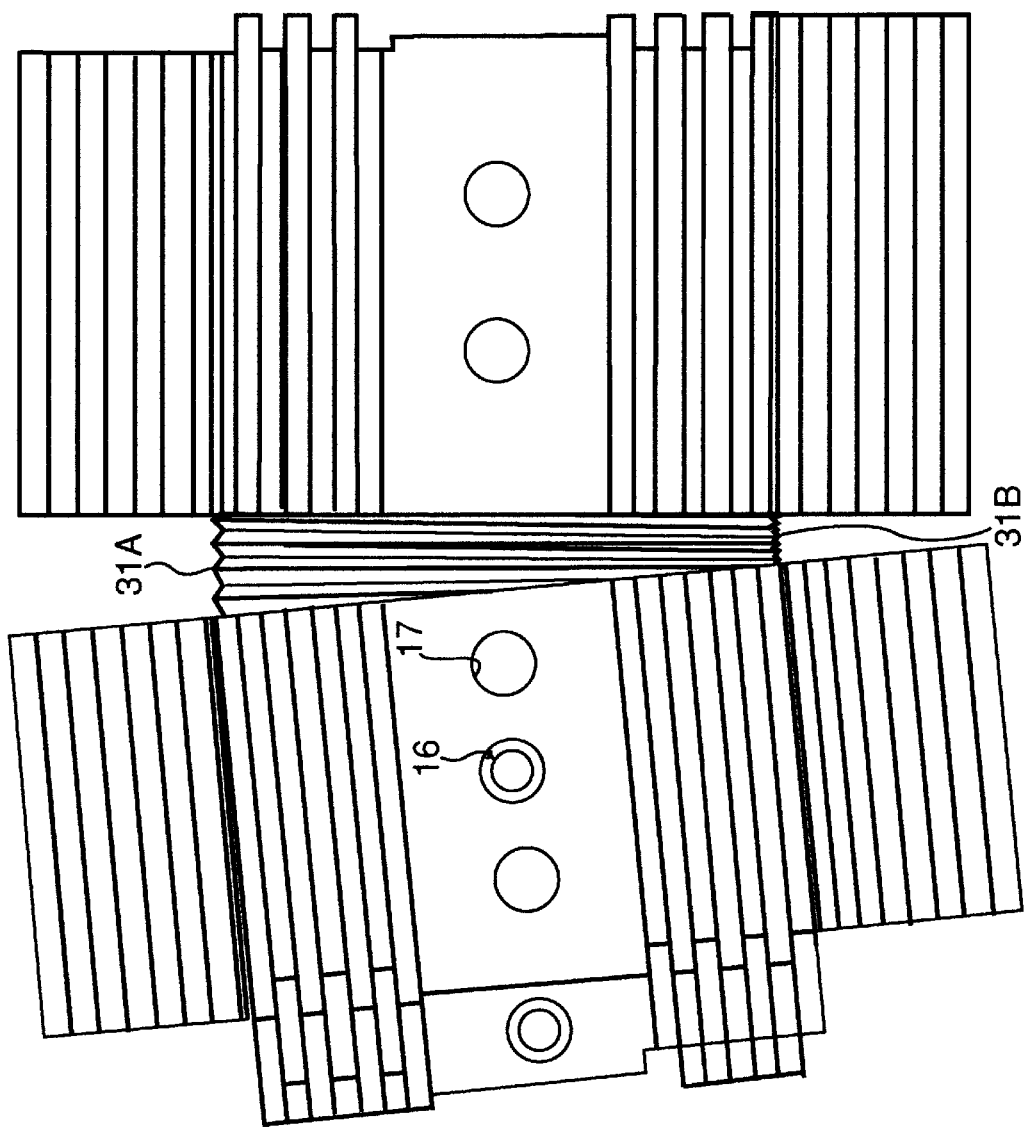
FIG. 13 is a top plan view of the segment of FIG. 11 illustrating the manner in which it can flex or bend longitudinally.

FIGS. 11–13 illustrate another embodiment of module or segment 30 useful in this invention. This segment includes a telescoping section 31 (preferably near the center of the segment). This type of segment is advantageous because it enables the segment to bend slightly (e.g., when it is necessary to assemble a curved fluid retaining wall).

The modules or segments are preferably composed of a tough, durable, flexible and resilient plastic (e.g., polyolefin such as polyethylene, or polypropylene, polyvinylchloride, nylon, polyester, etc.). Preferably the segments are made by means of a conventional rotational molding process. The wall thickness may vary (e.g., from about 0.04 inch to 0.4 inch, preferably 0.1 to 0.2 inch). The segments are light in weight and can be individually handled. They are portable and re-usable. They can be assembled into walls, for example, of any length, height and width as needed for a particular job. Preferably the width of the assembled wall is at least equal to or greater than the height of the wall.

Preferably the modules or segments have left and right sides which are mirror images of each other. Also, the opposite ends are mirror images of each other. This enables all the segments to be produced in the same mold and used anywhere in the assembly of a wall, for example.

Other variants are possible without departing from the scope of this invention.

What is claimed is:

1. A portable, modular fluid-containment system comprising a plurality of interlocking modules each having a cavity therein and a plurality of couplers communicating with said cavity; wherein each of said modules includes upper and lower surfaces with spaced-apart parallel ribs thereon; and wherein adjacent modules are coupled together by at least one of said couplers.

2. A system in accordance with claim 1, wherein each said module further includes at least one wing member extending laterally outwardly from said module.

3. A system in accordance with claim 2, wherein each of said modules includes opposing side edges and further comprises two said wing members extending laterally outward from said side edges in opposing directions.

4. A system in accordance with claim 3, wherein one of said wing members extends laterally outward from said upper surface and the other of said wing members extends laterally outward from said lower surface of said module.

5. A system in accordance with claim 3, wherein each of said wing members includes parallel ribs thereon which extend along the length of said wing member.

6. A system in accordance with claim 5, wherein said ribs include sides which are tapered towards each other.

7. A system in accordance with claim 1, wherein each said module includes stepped ends.

8. A system in accordance with claim 1, wherein each said coupler is closed with an openable cap member.

9. A system in accordance with claim 1, wherein each said module is collapsible.

10. A system in accordance with claim 9, wherein each said module is composed of plastic.

11. A system in accordance with claim 1, wherein each of said modules includes said plurality of couplers; wherein said modules adjacent to each other are connected by means of said couplers.

12. A module comprising a collapsible body member having a generally rectangular cross-section, an internal cavity and a plurality of apertures communicating with said cavity, and further comprising openable closure members for selectively closing said apertures, and further comprising at least one wing member extending laterally outwardly from said body member.

13. The module in accordance with claim 12, wherein said body member includes upper and lower surfaces with spaced-apart parallel ribs thereon.

14. The module in accordance with claim 13, wherein said body member includes stepped ends.

15. The module in accordance with claim 12, wherein said module includes upper and lower surfaces; further comprising an opening extending vertically through said module; and further comprising a column positioned in said opening.

16. The module in accordance with claim 12, wherein said module has ends and further includes a telescoping section enabling said module to bend between said ends.

17. A method for constructing a modular fluid-containment system to prevent a liquid from flooding an adjacent area, the method comprising the steps of:

(a) providing a plurality of interlocking modules each of which has a cavity therein and a plurality of couplers communicating with the cavity;

(b) stacking and interconnecting said modules by means of said couplers to form a wall extending between said liquid and said adjacent area to form a barrier; and (c) filling said cavity in each said module with liquid ballast.

18. The method in accordance with claim 17, wherein each said module includes at least one wing member extending outwardly therefrom.

19. The method in accordance with claim 18, wherein each said module includes stepped ends.

* * * * *